W. H. H. STINEMAN.
WHEEL FENDER.
APPLICATION FILED MAY 10, 1916.

1,219,602.

Patented Mar. 20, 1917.
2 SHEETS—SHEET 1.

Inventor
William H. H. Stineman
by
Wilkinson & Darley
Attorneys

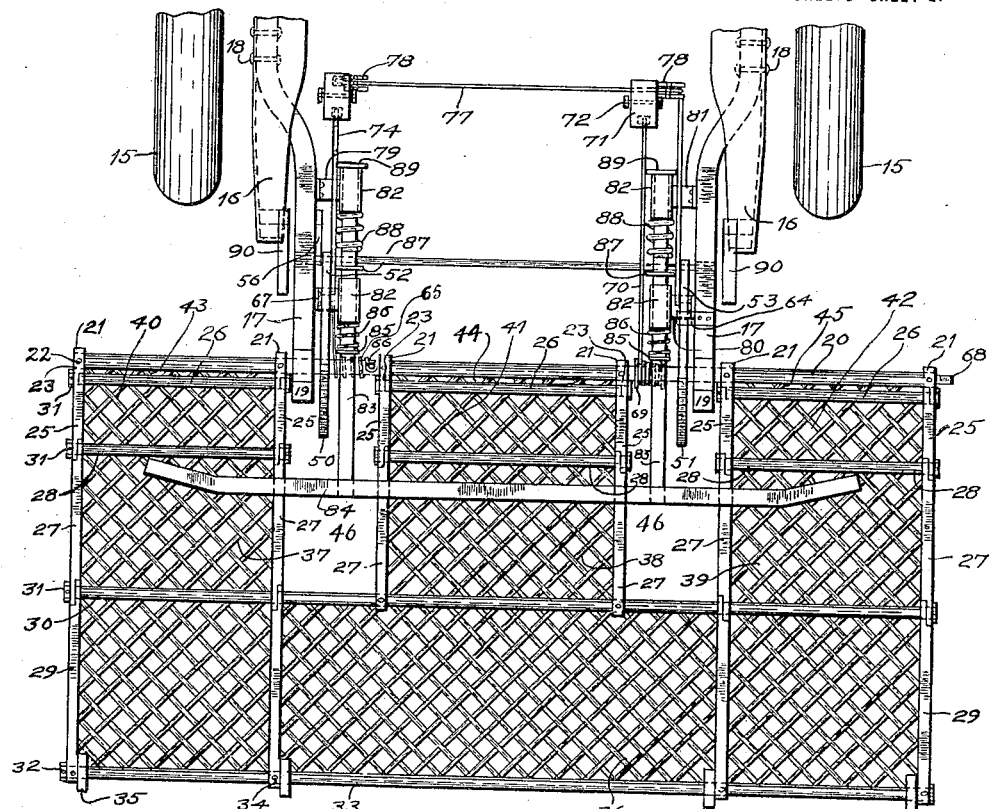

UNITED STATES PATENT OFFICE.

WILLIAM H. H. STINEMAN, OF BALTIMORE, MARYLAND, ASSIGNOR OF ONE-HALF TO STEPHEN COLQUITT PARDEE, OF BALTIMORE, MARYLAND.

WHEEL-FENDER.

1,219,602.  Specification of Letters Patent.  Patented Mar. 20, 1917.

Application filed May 10, 1916. Serial No. 96,674.

*To all whom it may concern:*

Be it known that I, WILLIAM H. H. STINEMAN, a citizen of the United States, residing at Baltimore, in the State of Maryland, have invented certain new and useful Improvements in Wheel-Fenders; and I do hereby declare the following to be a full, clear, and exact description of the invention, such as will enable others skilled in the art to which it appertains to make and use the same.

My invention relates to wheel fenders for vehicles.

The object of my invention is to provide a wheel fender especially adapted for use with a self-propelled vehicle such as an automobile, said fender being so constructed that it is rolled in a small space and covered with a shield when not in use.

In carrying out my invention I make use of the instrumentalities illustrated in the drawings in which:—

Fig. 4, is a view of the parts shown in Fig. 3, looking in the direction of the arrow 4 in said figure;

Fig. 5, is a detail view of parts hereinafter referred to;

Fig. 6, is a detail view of the knee joints of the fender frame;

Fig. 7, is a view of the parts shown in Fig. 6 looking in the direction of the arrow 7 in said figure;

Fig. 8, is a detail view of the parts hereinafter referred to; and

Fig. 9, is a view of the parts shown in Fig. 8 looking in the direction of the arrow 9 in said figure.

Figure 1:
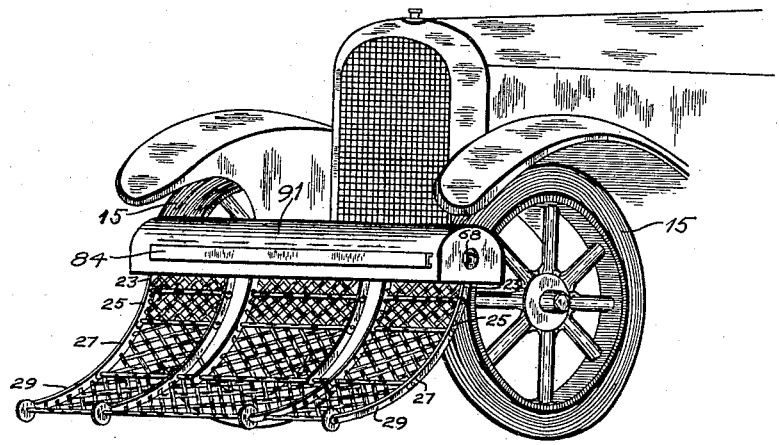
Figure 1, is a perspective view showing the front wheels, engine hood, wheel guards, and fender and casing,—the fender being shown open.

In the drawings 15 represents the front wheels of the automobile, 16—16 are the front portions of the chassis and to these front portions 16—16, I attach my two fender supports 17—17 by rivets such as 18—18.

The fender supports 17—17 are shaped in any approved manner and are provided with bearing portions 19—19, in which is revolubly mounted the shaft 20. A plurality of arms such as 21 are fitted tightly upon shaft 20 and secured thereto by pins such as 22.

Links such as 23 are secured to the arms 21 by shafts such as 24, links 25 are secured to the links 23 by the shafts 26, links 27 are secured to the links 25 by the shafts 28, and links 29 are secured to the links 27 by a shaft 30. Collars such as 31 secured on the ends of the various shafts by the pins 32, serve to prevent lateral displacement of said shafts.

A shaft 33 fits tightly in holes provided in the front ends of the links 29, and is secured therein by pins such as 34. A plurality of rollers such as 35 are revolubly mounted upon the shaft 33 adjacent to the links 29. Wire netting 36 or any other suitable material is secured to the links 29, and said netting extends the full width of the fender and between the shafts 30 and 33.

Wire nettings such as 37, 38, and 39, (see Fig. 4) extend respectively between the two links 27—27 on the left, the two central links 27—27 and the two links 27—27 on the right and between the shafts 28 and 30.

Wire nettings such as 40, 41 and 42, (see Fig. 4) extend between the links 25—25 on the left, the central links 25—25 and the links 25—25 on the right and between the shafts 26 and 28.

Wire nettings such as 43, 44, and 45 (see Fig. 4) extend respectively between the two links 23—23 on the left, the two central links 23—23 and the two links 23—23 on the right and between the shafts 24 and 26.

It is to be noted that the shafts 20, 30 and 33, extend from side to side of the fender, but that the shafts 24, 26 and 28 are each made in three sections; also that the netting 36 extends from side to side of the fender, whereas the nettings between the links 23, 25 and 27 are made in three pieces. The purpose of this construction is to provide two open spaces 46—46 in the body of the fender for clearance around some of the working parts as hereinafter explained.

The arms 21 and the links 23, 25, 27 and 29 are provided with knee joints such as are illustrated with reference to the links 25 and 27 in Figs. 6 and 7, in which it will be noted that near the end, each link is reduced in width as shown at 47 in said figures with reference to link 27. The ends of the arms 21 where they join the links 23 are similarly reduced in width and the end of said reduced portion is shaped as shown at 49 with reference to the links 25 and 27. The ends of the reduced portion of all links are shaped as shown at 49 with reference to links 25 and 27.

Figure 3:
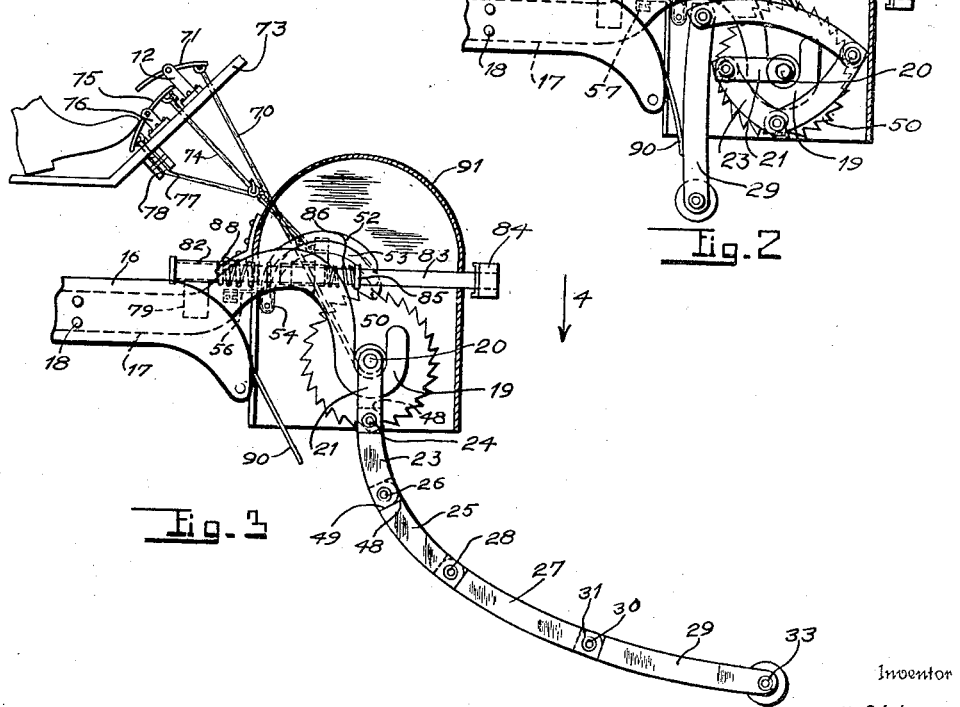
Fig. 3, is a view similar to Fig. 2 but showing the fender extended for use. This figure also shows a portion of the body of the automobile with the pedals and connections for operating the fender, (for the sake of clearness the teeth of the ratchet wheel 51 are not shown in Figs. 2 and 3)

Faces such as 48—48 are provided on the arms 21 and the various links to abut against the ends 49 as shown in Fig. 3 in order to prevent any of the said links from moving in a clockwise direction from the position shown in said figure.

Ratchet wheels 50 and 51 are rigidly secured in any approved manner to the shaft 20. Pawls 52 and 53 are pivotedly mounted upon brackets 54 and 55 attached to the fender supports 17—17.

Figure 2:
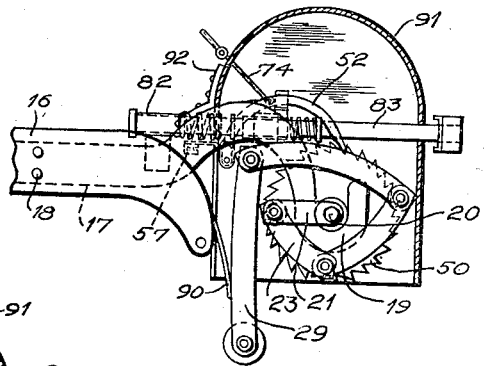
Fig. 2, shows the fender in its rolled position, the shield being shown in section.

The pawl 52 is kept in engagement with the teeth of the ratchet wheel 50, as shown in Fig. 2, by the spring 56, said spring is provided with a downwardly extending portion 57, which is secured to one of the fender supports 17 by rivets such as 58. The front portion of the spring 56 is bent downwardly as at 59 and again upwardly as at 60, and when the parts are as shown in Fig. 2, the portion 60 bears against the incline 61, formed on the upper end of an arm 62, which is made integrally with the pawl 52. A second inclined portion 63 is also provided upon the arm 62 for a purpose hereinafter explained. The pawl 53 is kept in engagement with the teeth of the ratchet wheel 51 by the spring 64, which is secured in any approved manner to one of the fender supports 17.

A spring 65 is coiled around the shaft 20 and has one end secured thereto as at 66. The other end of the spring 65 is secured under the bracket 67 attached to one of the fender supports 17. The spring 65 is so arranged as to give the shaft 20 a tendency to turn in a counter-clockwise direction as shown in Fig. 3. A square end 68 is provided on the right hand end, as shown in Fig. 4, of the shaft 20. A drum 69 is also secured upon said shaft and a cord 70, having one end secured to said drum is wound around said drum and the other end extends to the inside of the dash board of the automobile, a shown in Fig. 3, and is secured to one end of a pedal 71, pivotedly mounted on a bracket 72, secured to the dash board 73.

A wire 74 has one end pivotedly attached to the pawl 52 and extends to the inside of the dash board 73 and its other end is attached to one end of the pedal 75, which is pivotedly mounted on the bracket 76, attached to the dash board 73. To the other end of the pedal 75 is secured a cord 77 which passes over suitably disposed pulleys 78—78 and has its other end connected to the pawl 53. Two brackets 79 and 67 are secured to the left hand fender support 17, as shown in Fig. 4, and two similar brackets 80 and 81 are likewise secured to the right hand fender support 17. Said brackets are each provided with bosses, such as 82, having holes in which are slidably mounted the rods 83—83. The front ends of the rods 83—83 are joined together by the buffer 84, rigidly secured thereto. Shoulders 85—85 are provided upon the rods 83—83 and between said shoulders and the bosses 82—82 attached to the brackets 67 and 80 compression springs 86—86 are mounted which normally tend to keep the buffer 84 in the position shown in Figs. 2, 3 and 4.

Two other shoulders 87—87 are provided upon the rods 83, and two coil springs 88—88 are placed between said shoulders and the bosses 82—82 mounted upon the brackets 79 and 81. The springs 88 are compression springs, but they do not extend the full distance between the bosses 82 and the shoulders 87. Shoulders such as 89—89 are secured to the ends of the rods 83—83 to prevent the buffer 84 from moving farther toward the front than is shown in Figs. 2, 3 and 4.

Two springs 90—90 are secured in any approved manner to the front of the chassis 16 for a purpose hereinafter explained.

A shield such as 91 is placed over the fender and coöperating parts, as shown in Figs. 1, 2 and 3, so as to protect them from injury and to present a neat appearance. The shield 91 is provided with suitable holes for the passage of the various rods and connections. The shield 91 is secured to the fender supports 17 as by brackets such as 92, (see Fig. 5).

The pawl 52 is also provided with an upward extension 94, adapted to be contacted by the tappet 93 attached to the adjacent rod 83.

The operation of my improved device is as follows:—

If the fender is down, as shown in Figs. 1, 3 and 4, it can be folded up as shown in Fig. 2, by applying a crank to the square end 68 of the shaft 20 and turning said crank in a counter-clockwise direction. This will cause the arm 21 to move in a counter-clockwise direction which will gradually roll up the fender, to the position shown in Fig. 2, against the tension of the spring 65. It is to be understood that during this operation the pawl 52 is to be in the position as shown in Fig. 2, in contact with the teeth of the ratchet 50, so that when the fender is folded as shown in said figure, the pawl 52 will prevent it from moving from this position.

If now the chauffeur should desire to drop the fender to prevent injury to a pedestrian, he can press against the lower end of the pedal 75. This will pull the pawl 52 upwardly, as shown in Fig. 3, thus releasing the ratchet wheel 50 and the spring 65 will cause the fender to drop to the position shown in Fig. 3.

Should the chauffeur not see the pedestrian in time, when the body of the pedestrian strikes the buffer 84, the rods 83 will be moved backwardly, the tappet 93 will strike the portion 94 of the pawl 52 and raise the pawl 52 from the teeth of the ratchet 50 and then the fender will drop as before explained.

It will be noted, by reference to Fig. 8, that the incline 60 of the spring 56 bearing against the incline 61 of the pawl 52 keeps said pawl normally in contact with the teeth of the ratchet wheel 50 and that when said pawl is lifted as before explained, the incline 59 of said spring will come into contact with the incline 62 of said pawl, thus holding said pawl in the position shown in Fig. 3.

When the fender is in the position shown in Fig. 3, the pawl 53 is in contact with the teeth of the ratchet wheel 51 and thus any motion of the fender in a clockwise direction from the position shown in Fig. 3 is prevented.

The fender then can be reset as before explained by applying the crank to the square end 68 or by pressing upon the lower end of the pedal 71 and thus pulling the cord 70; but in both cases it is to be noted that before the fender is reset it is necessary to push the upper end of the pedal 75 downwardly so as to bring the pawl 52 into contact with the teeth of the ratchet wheel 50, and by reason of the connection of the cord 77 to the other end of said pedal, it is evident that the pawl 53 will be raised from the ratchet wheel 51 so that it cannot prevent the resetting of the fender.

The open spaces 46—46 in the body of the fender are provided for the clearance around the fender supports, ratchet wheels and pawls.

The springs 90—90 are provided to bear against the links 29 when the fender is folded, as shown in Fig. 2, in order to prevent rattling of the parts.

When the pedestrian's body strikes the buffer 84, he ordinarily compresses the springs 86 to effect the operation of the fender and the springs 88—88 never come into play, but should the buffer 84 strike some extremely heavy object the springs 88—88 are provided to prevent undue stress upon the parts.

I claim:—

1. The combination with a rolling fender, of a fixed shield partially surrounding said fender when rolled and a buffer supported in front of said shield.

2. The combination with a rolling fender, of a fixed shield partially surrounding said fender when rolled, means for locking said fender in the rolled position, a yielding buffer supported in front of said shield and means for moving said locking means by the movement of said buffer.

3. The combination with a rigidly supported fixed shield of a yielding buffer supported adjacent thereto, a rolling fender mounted in said shield, means for unrolling said fender and means operated by said buffer for controlling the unrolling of said fender mounted in front of said shield.

4. The combination with a main shaft, of links secured thereto, a second shaft mounted in the free ends of said links, a second set of links revolubly mounted upon said second shaft, a third shaft mounted in the free ends of said second set of links, a third set of links revolubly mounted upon said third shaft and so on for any number of shafts and sets of links, said links being so sized and shaped as to roll into a small space when said main shaft is revolved.

5. The combination with a main shaft, of links secured thereto, a second shaft mounted in the free ends of said links, a second set of links revolubly mounted upon said second shaft, a third shaft mounted in the free ends of said second set of links, a third set of links revolubly mounted upon said third shaft and so on for any number of shafts and sets of links, said links being so sized and shaped as to roll into a small space when said main shaft is revolved, and nettings supported by said shafts and links.

6. The combination with a shaft of a rolling fender supported thereby, a ratchet wheel mounted to move with said fender, supporting means for said shaft, means for rolling and unrolling said fender and pawls mounted on said supporting means for locking said fender in the rolled and unrolled position.

7. The combination with a rolling fender, of unrolling means for said fender, a yielding buffer for unlocking said unrolling means, a spring for keeping said buffer in its normal position and yielding under slight pressure and a second spring resisting the movement of said buffer after said unrolling means has been unlocked.

8. The combination with a main shaft, of links secured thereto, a second shaft mounted in the free ends of said links, a second set of links revolubly mounted upon said second shaft, a third shaft mounted in the free ends of said second set of links, a third set of links revolubly mounted upon said third shaft and so on for any number of shafts and sets of links, said links being so sized and shaped as to roll into a small space, a face on each link adapted to coöperate with the end of the adjacent link to support the fender in position when unrolled and means for rolling and unrolling said fender.

In testimony whereof, I affix my signature.

WILLIAM H. H. STINEMAN.

Copies of this patent may be obtained for five cents each, by addressing the "Commissioner of Patents, Washington, D. C."